United States Patent
Haissig

(10) Patent No.: US 8,108,133 B2
(45) Date of Patent: Jan. 31, 2012

(54) VEHICLE POSITION KEEPING SYSTEM

(75) Inventor: Christine M. Haissig, Chanhassen, MN (US)

(73) Assignee: Honeywell International Inc., Morristown, NJ (US)

(*) Notice: Subject to any disclaimer, the term of this patent is extended or adjusted under 35 U.S.C. 154(b) by 25 days.

(21) Appl. No.: 12/559,244

(22) Filed: Sep. 14, 2009

(65) Prior Publication Data

US 2011/0066360 A1 Mar. 17, 2011

(51) Int. Cl.
*G06F 19/00* (2006.01)
(52) U.S. Cl. ...................................................... 701/116
(58) Field of Classification Search .......... 701/207–209, 701/220; 342/29, 30, 357.08, 455
See application file for complete search history.

(56) References Cited

U.S. PATENT DOCUMENTS

| | | | |
|---|---|---|---|
| 2002/0011950 A1* | 1/2002 | Frazier et al. | 342/357.08 |
| 2003/0122701 A1* | 7/2003 | Tran | 342/29 |
| 2005/0165516 A1* | 7/2005 | Haissig et al. | 701/4 |

* cited by examiner

*Primary Examiner* — John Nguyen
*Assistant Examiner* — Rodney P King
(74) *Attorney, Agent, or Firm* — Lowe Graham Jones PLLC

(57) ABSTRACT

Vehicle position keeping systems and methods. The system reduces vehicle congestion by maintaining a position of a first vehicle relative to a second vehicle, determining guidance corrections based on a track state referenced to the second vehicle that take into account a tracking position error indicative of the error in the position of the first vehicle. The guidance corrections maintain desired spacing between the first vehicle and at least the second vehicle.

10 Claims, 11 Drawing Sheets

| Following Procedure | Track Velocity | | | | Commanded Acceleration | | |
|---|---|---|---|---|---|---|---|
| | $v_{track}$ | $\chi_{track}$ | $\gamma_{track}$ | | $v_{dottrack}$ | $\chi_{dottrack}$ | $\gamma_{track}$ |
| In-Trail Following Constant Altitude/Heading/Track Angle<br>• Tracking Current TTF Position | $v$ OR $v_{FP}$ | $\chi$ OR $\chi_{FP}$ | 0 | | 0 | 0 | 0 |
| In-Trail Following Constant Altitude/Heading/Track Angle<br>• Tracking Previous TTF Position | $v$ OR $v_{FP}$ | $\chi$ OR $\chi_{FP}$ | 0 | | 0 | 0 | 0 |
| In-Trail Following with Altitude Change<br>• TTF Has Initiated Altitude Change but Own Ship Has Not<br>• Constant Heading or Track Angle<br>• Tracking Previous TTF Position | $(x_{TTF}^{PK}(t_{startman}) - x^{PK}(t)) / (t_{startman} - t)$ | $\chi$ OR $\chi_{FP}$ | 0 | | 0 | 0 | 0 |
| In-Trail Following with Altitude Change<br>• TTF and Own Ship Have Initiated Altitude Change<br>• Constant Heading or Track Angle<br>• Tracking Previous TTF Position | $v$ OR $v_{FP}$ | $\chi$ OR $\chi_{FP}$ | $arcsin(h_{dotFP}/v_{track})$ OR $arcsin(h_{dot}/v_{track})$ | | 0 | 0 | 0 |

*FIG. 7-1*

| | | | | | | |
|---|---|---|---|---|---|---|
| In-Trail Following with Heading or Track Changes but Constant Altitude<br>• TTF Has Initiated Turn but Own Ship Has Not<br>• Tracking Previous TTF Position | $(x_{TTF}^{PK}(t_{startman}) - x^{PK}(t))/(t_{startman} - t)$ | $\chi$ OR $\chi_{FP}$ | 0 | 0 | 0 | 0 |
| In-Trail Following with Heading or Track Changes but Constant Altitude<br>• TTF and Own Ship Have Initiated Turn<br>• Tracking Previous TTF Position | $v_{TTF}(t - SI_{time})$ | $\chi_{TTF}(t - SI_{time})$ | 0 | 0 | $\chi_{dotFP}$ OR $\chi_{dot}$ | 0 |

FIG. 7-2

| Scenario | | | | | | | |
|---|---|---|---|---|---|---|---|
| In-Trail Following with Heading or Track Changes and Altitude Change<br>• TTF Has Initiated Turn but Own Ship Has Not<br>• Tracking Previous TTF Position | $(x_{TTF}^{PK}(t_{startman}) - x^{PK}(t))/(t_{startman} - t)$ | $\chi$ OR $\chi_{FP}$ | 0 | 0 | 0 | 0 | 0 |
| In-Trail Following with Heading or Track Changes and Altitude Change<br>• TTF and Own Ship Have Initiated Turn<br>• Tracking Previous TTF Position | $v_{TTF}(t - SI_{time})$ | $\chi_{TTF}(t - SI_{time})$ | $\arcsin(h_{dotFP}/v_{track})$ OR $\arcsin(h_{dot}/v_{track})$ | 0 | $\chi_{dotFP}$ OR $\chi_{dot}$ | 0 | 0 |
| In-Trail Following During Merging Operations | $v$ OR $v_{FP}$ | $\chi$ OR $\chi_{FP}$ | 0 | 0 | 0 | 0 | 0 |

FIG. 7-3

| Following Procedure | $\Delta x^{PK}$ | $\Delta x_{ref}^{PK}$ | $e^{PK}$ | $\psi_{PK}$ |
|---|---|---|---|---|
| In-Trail Following Constant Altitude/Heading/Track Angle<br>• Tracking Current TTF Position | $x_{TTF}^{PK}(t) - x^{PK}(t)$ | $SI_{dist}$ (spacing specified as distance)<br>OR<br>$v*SI_{time}$ (spacing specified as time) | $(\Delta x^{PK} - \Delta x_{ref}^{PK}, 0, 0)$<br>for exact spacing<br>OR<br>$(min(0,(\Delta x^{PK} - \Delta x_{ref}^{PK})), 0, 0)$<br>for at least spacing | $\psi$ or $\chi$<br>(no flight plan information)<br>OR<br>$\psi_{FP}$ or $\chi_{FP}$<br>(flight plan information) |
| In-Trail Following Constant Altitude/Heading/Track Angle<br>• Tracking Previous TTF Position | $x_{TTF}^{PK}(t - SI_{time}) - x^{PK}(t)$ | $SI_{dist}$ (spacing specified as distance)<br>OR<br>$v*SI_{time}$ (spacing specified as time) | $(\Delta x^{PK} - \Delta x_{ref}^{PK}, 0, 0)$<br>for exact spacing<br>OR<br>$(min(0,(\Delta x^{PK} - \Delta x_{ref}^{PK})), 0, 0)$<br>for at least spacing | $\psi$ or $\chi$<br>(no flight plan information)<br>OR<br>$\psi_{FP}$ or $\chi_{FP}$<br>(flight plan information) |
| In-Trail Following with Altitude Change<br>• TTF Has Initiated Altitude Change But Own Ship Has Not<br>• Constant Heading or Track Angle<br>• Tracking Previous TTF Position | $x_{TTF}^{PK}(t_{startman}) - x^{PK}(t)$ | $v * (t - t_{startman})$ | $(\Delta x^{PK} - \Delta x_{ref}^{PK}, 0, 0)$<br>for exact spacing<br>OR<br>$(min(0,(\Delta x^{PK} - \Delta x_{ref}^{PK})), 0, 0)$<br>for at least spacing<br>OR<br>$(0, 0, 0)$ | $\psi$ or $\chi$<br>(no flight plan information)<br>OR<br>$\psi_{FP}$ or $\chi_{FP}$<br>(flight plan information) |
| In-Trail Following with Altitude Change<br>• TTF and Own Ship Have Initiated Altitude Change<br>• Constant Heading or Track Angle<br>• Tracking Previous TTF Position | $x_{TTF}^{PK}(t - SI_{time}) - x^{PK}(t)$ | $0$ | $(\Delta x^{PK} - \Delta x_{ref}^{PK}, 0, 0)$<br>for exact spacing<br>OR<br>$(min(0,(\Delta x^{PK} - \Delta x_{ref}^{PK})), 0, 0)$<br>for at least spacing | $\psi$ or $\chi$<br>(no flight plan information)<br>OR<br>$\psi_{FP}$ or $\chi_{FP}$<br>(flight plan information) |

*FIG. 8-1*

| | | | |
|---|---|---|---|
| In-Trail Following with Heading or Track Changes<br>• TTF Has Initiated Turn But Own Ship Has Not<br>• Constant Altitude or Altitude Change<br>• Tracking Previous TTF Position | $x_{TTF}^{PK}(t_{startman}) - x^{PK}(t)$ | $v * (t - t_{startman})$ | $(\Delta x^{PK} - \Delta x_{ref}^{PK}, 0, 0)$<br>for exact spacing<br>OR<br>$(min(0,(\Delta x^{PK} - \Delta x_{ref}^{PK})), 0, 0)$<br>for at least spacing<br>OR<br>$(0, 0, 0)$ | $\psi$ or $\chi$<br>(no flight plan information)<br>OR<br>$\psi_{FP}$ or $\chi_{FP}$<br>(flight plan information) |
| In-Trail Following with Heading or Track Changes<br>• TTF and Own Ship Have Initiated Turn<br>• Constant Altitude or Altitude Change<br>• Tracking Previous TTF Position | $x_{TTF}^{PK}(t - SI_{time}) - x^{PK}(t)$ | $0$ | $(\Delta x^{PK} - \Delta x_{ref}^{PK}, 0, 0)$<br>for exact spacing<br>OR<br>$(min(0,(\Delta x^{PK} - \Delta x_{ref}^{PK})), 0, 0)$<br>for at least spacing<br>OR<br>$(0, 0, 0)$ if do want to make speed adjustments during a turn | $\psi_{TTF}(t - SI_{time})$ or $\chi_{TTF}(t - SI_{time})$<br>OR<br>$\psi$ or $\chi$ |
| Spacing During Merging Operations | $C(x_{TTF}^{PK}(t) - x_{MP}^{PK}) - (x^{PK}(t) - x_{MP}^{PK})$ | $SI_{dist}$ (spacing specified as distance)<br>OR<br>$v*SI_{time}$ (spacing specified as time) | $(\Delta x^{PK} - \Delta x_{ref}^{PK}, 0, 0)$<br>for exact spacing<br>OR<br>$(min(0,(\Delta x^{PK} - \Delta x_{ref}^{PK})), 0, 0)$<br>for at least spacing | $\psi$ or $\chi$<br>(no flight plan information)<br>OR<br>$\psi_{FP}$ or $\chi_{FP}$<br>(flight plan information) |

*FIG.8-2*

VEHICLE POSITION KEEPING SYSTEM

BACKGROUND OF THE INVENTION

Aircraft traffic capacity is limited. Aircraft basically fly along highways in the sky, and those highways have become congested. Aircraft congestion on air routes is especially problematic on crowded oceanic air routes and also around the terminal area of airports. If aircraft could be spaced more precisely during flight, congestion could be reduced. Reducing air traffic congestion could increase air traffic capacity, thereby increasing landing capacity at airports, reducing flight delays, and reducing the workload of air traffic control (ATC).

Improved systems currently exist for maintaining spacing between aircraft flying in formation. However, formation flight is primarily used in military applications. The position keeping algorithms utilized by aircraft flying in formation cannot be utilized in most commercial flying settings because commercial aircraft seldom, if ever, fly in formation.

SUMMARY OF THE INVENTION

This invention allows an aircraft, referred to as own-ship, to maintain in-trail spacing with another aircraft, referred to as traffic-to-follow, given the desired spacing interval in time or distance and the reported position of the lead aircraft. The invention also provides spacing for aircraft on different flight paths that need to merge at a common merge fix at a given spacing interval. The present invention provides excellent tracking performance and is stable for large linked chains of aircraft. The present invention makes use of flight plan information from own-ship or traffic-to-follow, if available, for even better tracking performance. The present invention also maintains in-trail spacing during climbs, descents or turns.

BRIEF DESCRIPTION OF THE DRAWINGS

Preferred and alternative embodiments of the present invention are described in detail below with reference to the following drawings:

FIGS. 6-1, 6-2, and 6-3 are side views showing a sequential altitude change;

FIGS. 7-1, 7-2, and 7-3 are tables summarizing tracking state and maneuver track rate calculations; and FIGS. 8-1 and 8-2 are tables summarizing tracking error calculations.

DETAILED DESCRIPTION OF THE INVENTION

Position keeping guidance according to the present invention uses spacing procedures to provide guidance for piloting an aircraft referred to as "own-ship" with desired spacing relative to one or more aircraft referred to as traffic-to-follow (TTF). The present invention is an extension of Honeywell U.S. Pat. No. 6,963,795, Vehicle Position Keeping System, which describes methods for keeping the position of vehicles flying in formation. U.S. Pat. No. 6,963,795 is hereby incorporated by reference in its entirety.

Figure 1:
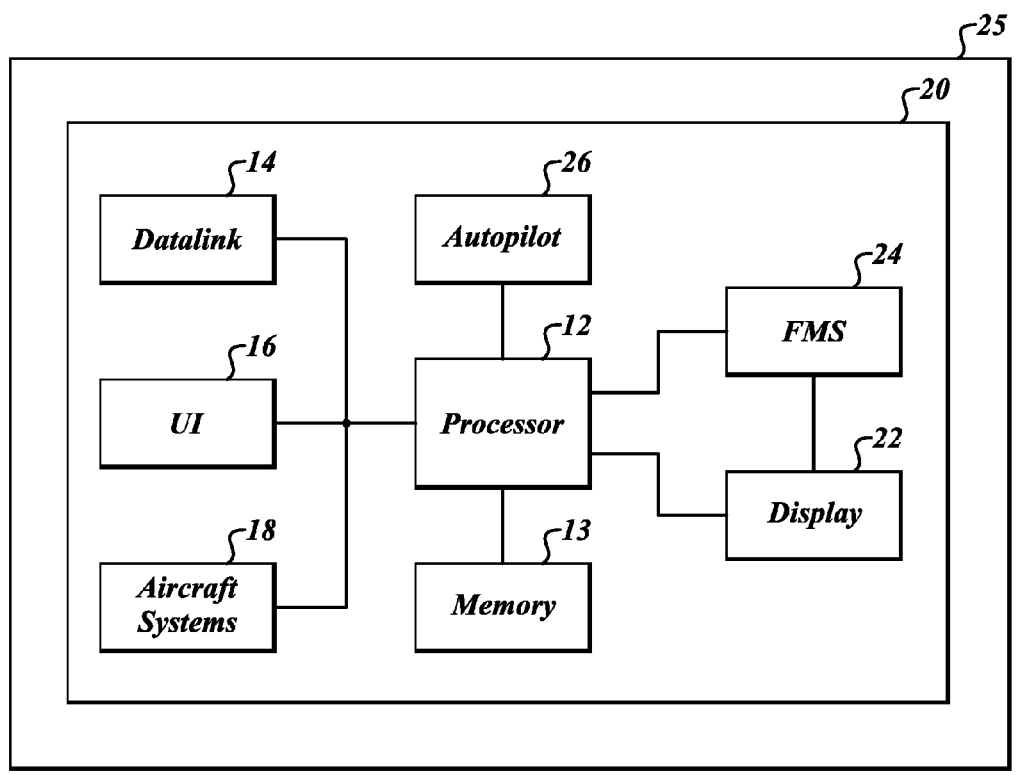
FIG. 1 is a block diagram showing a position keeping system formed in accordance with an embodiment of the present invention.

An example position keeping system 20 formed in accordance with an embodiment of the present invention is shown in FIG. 1. The position keeping system 20 includes a processor 12 that is in signal communication with memory 13, an autopilot 26, a Flight Management System (FMS) 24, a display 22, a datalink 14, a user interface (UI) 16, and other aircraft systems 18. In one embodiment, the position keeping system 20 is located on an aircraft 25, which is operating as an own-ship. In an alternative embodiment, only a portion of the position keeping system 20 is located on the aircraft 25.

As will be discussed below in greater detail, the processor 12 determines the spacing mode for the aircraft, the track velocity and tracking position error of the aircraft 25 and computes position keeping guidance commands for display or for input to the FMS 24 and/or the autopilot 26. In one embodiment, the display 22 presents some or all of computed errors and/or position keeping instructions to a pilot so that the pilot can maintain the aircraft 25 with the desired spacing relative to one or more TTFs. Some or all of the computed errors and/or position keeping instructions are presented to the pilot via the display 22. The pilot can fly the instructions manually or input them into the autopilot. In an alternative embodiment, the output of the processor 12 is supplied to the autopilot 26 and adjustments is made automatically by the autopilot 26 to maintain a desired position of the own-ship or desired spacing relative to the TTF. In another alternative embodiment, the output of the processor 12 is supplied to the FMS 26 and adjustments are made automatically by the FMS 26 to maintain a desired position of the own-ship or desired spacing relative to the TTF.

Figure 2:
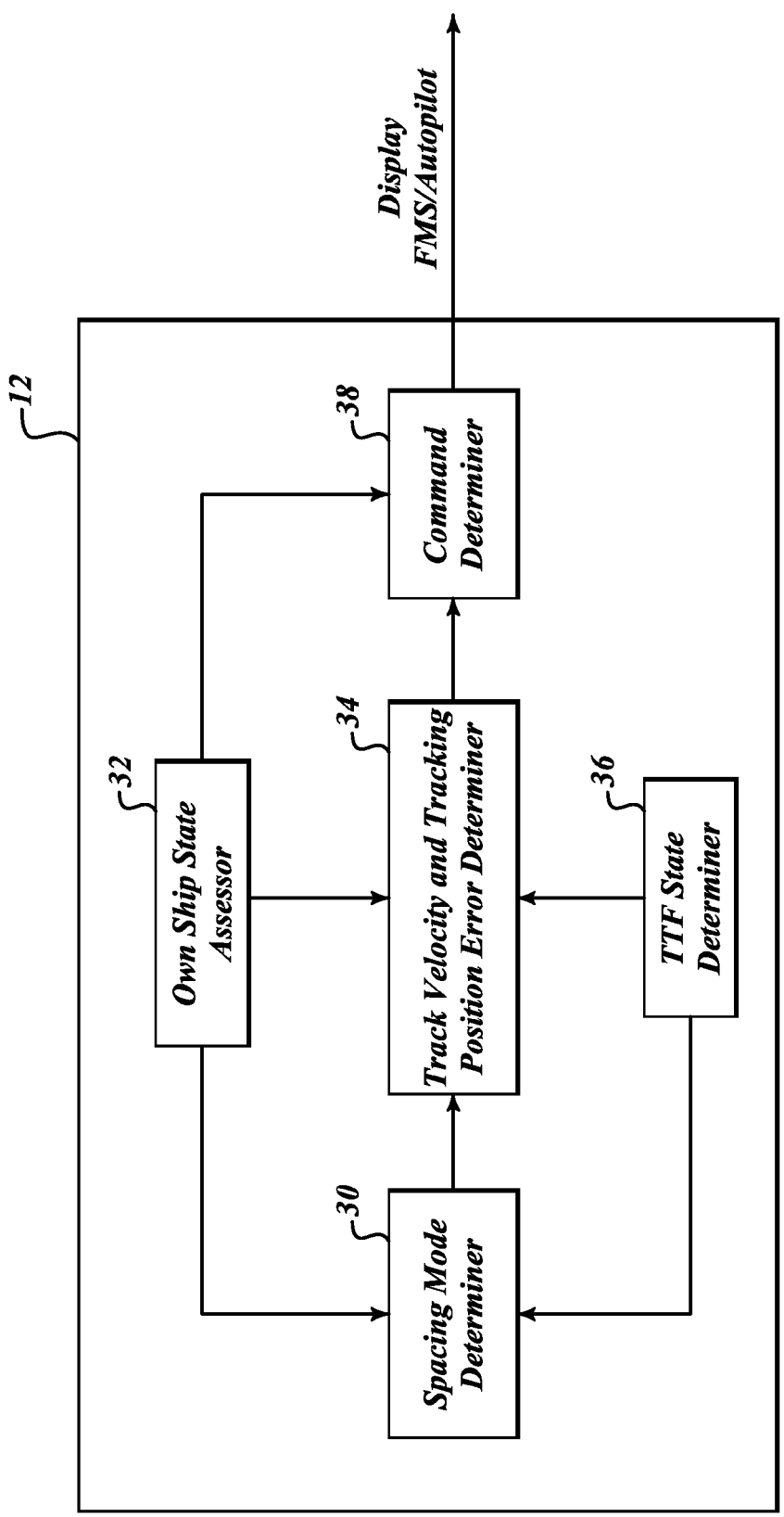
FIG. 2 is a block diagram showing more detail of the position keeping system in FIG. 1.

FIG. 2 illustrates the process performed by the processor 12 of FIG. 1 in greater detail. The processor 12 includes a spacing mode determiner 30, a track velocity and tracking position error determiner 34, and a commands determiner 38. The track velocity and tracking position error determiner 34, the spacing mode determiner 30, and the determine commands determiner 38 receive information from an own-ship state determiner 32. The track velocity and tracking position error calculation determiner 34 and spacing mode determiner 30 also receive information from a TTF state determiner 36. The determine commands block 38 passes commands to the display 22, the FMS 24 and/or the autopilot 26 based on the information received from the own-ship assessor 32 and the track velocity and tracking position error determiner 34.

Figure 3:
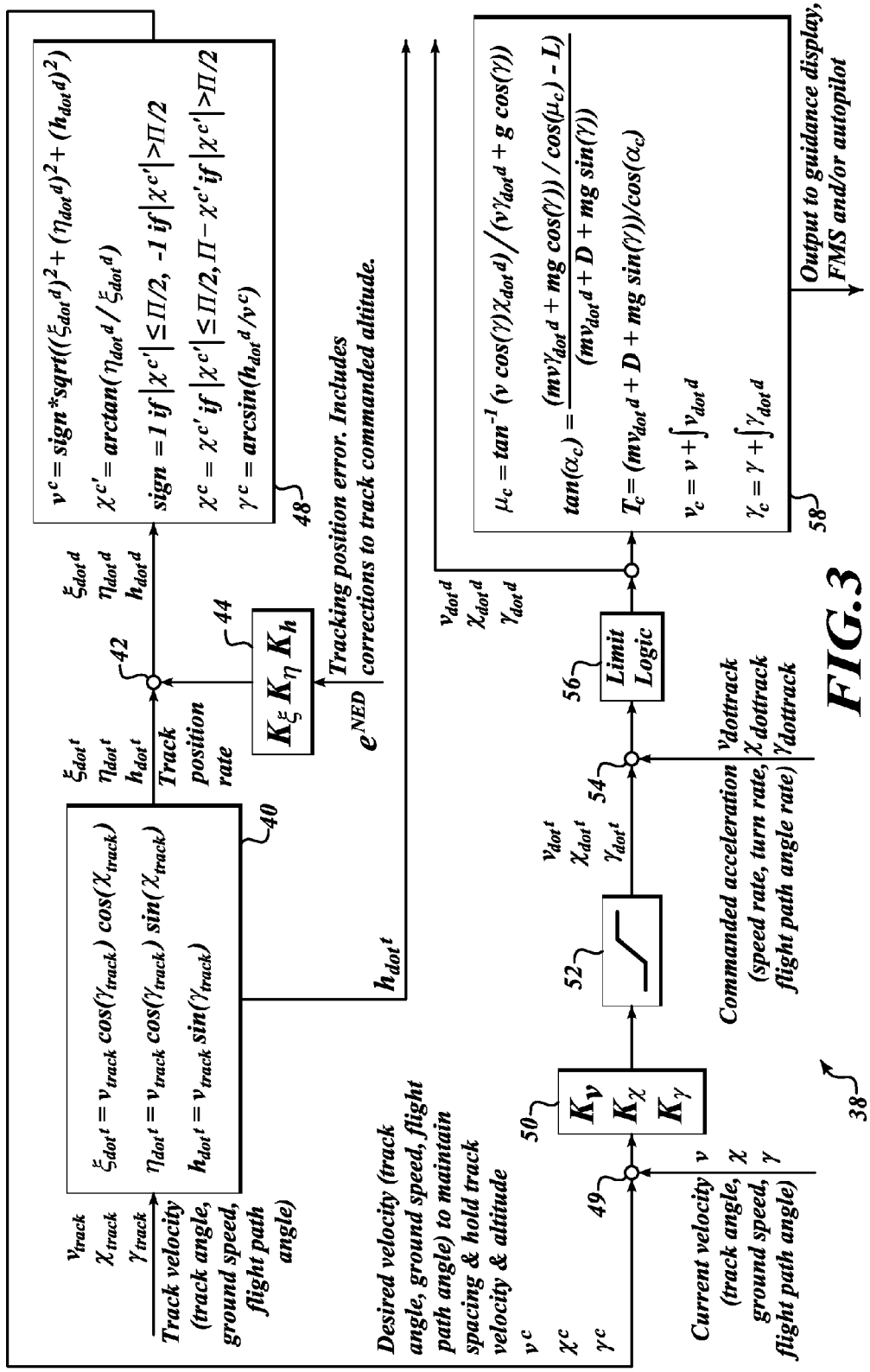
FIG. 3 is a block diagram showing the position keeping calculations performed by the position keeping system.

FIG. 3 is a block diagram illustrating the position guidance law calculations performed by the commands component 38 in the processor 12. The primary inputs are a track velocity (e.g. ground speed) $v_{track}$, a track angle $\chi_{track}$, a flight path angle $\gamma_{track}$, and a tracking position error $e^{NED}$. NED designates a North, East, and down reference frame. As will be understood from the description below, the track velocity is dependent upon information supplied by or about the state of own-ship. In one embodiment, this information is supplied by the FMS 24 and/or the other aircraft systems 18.

The tracking position error $e^{NED}$ is calculated using the position of the own-ship relative to the TTF. The position between the TTF and the own-ship is provided by a relative position determining device, calculated using the TTF position and own-ship position, or calculated using a combination of the two. When the TTF information is provided over the datalink 14 the source of the information is usually an onboard navigation system, which could be an inertial navigation system (INS), a global positioning system (GPS)-based navigation system, a combined GPS/INS or other system. In one embodiment, the navigation data is augmented by other on-board system data, such as air data. Data related to the TTF could be linked directly to the own-ship, be linked via other aircraft, or be linked through a ground station.

A ground speed $v_{track}$, a track angle $\chi_{track}$, and a flight path angle $\gamma_{track}$ are used by a block 40 to calculate a North position rate $\xi_{dot}^{t}$, an East position rate $\eta_{dot}^{t}$, and a vertical position rate $h_{dot}^{t}$ according to the following equations:

$$\xi_{dot}^{t} = v_{track} \cos(\gamma_{track})\cos(\chi_{track}) \quad (1)$$

$$\eta_{dot}^{t} = v_{track} \cos(\gamma_{track})\sin(\chi_{track}) \quad (2)$$

$$h_{dot}^{t} = v_{track} \sin(\gamma_{track}) \quad (3)$$

An adder 42 adds the North position rate $\xi_{dot}^{t}$, the East position rate $\eta_{dot}^{t}$, and the vertical position rate $h_{dot}^{t}$ to a North tracking error rate $K_\xi e_\xi$, an East tracking error rate $K_\eta e_\eta$ and a vertical tracking error rate $K_h e_h$, respectively, according to the following equations:

$$\xi_{dot}^{d} = \xi_{dot}^{t} + K_\xi e_\xi \quad (4)$$

$$\eta_{dot}^{d} = \eta_{dot}^{t} + K_\eta e_\eta \quad (5)$$

$$h_{dot}^{d} = h_{dot}^{t} + K_h e_h \quad (6)$$

in order to calculate a combined position error rate $\xi_{dot}^{d}$, $\eta_{dot}^{d}$, $h_{dot}^{d}$ that balances the goal of following the desired track angle, ground speed, and geometric altitude and the desired spacing between the TTF and the own-ship. North tracking error rate $K_\xi e_\xi$, the East tracking error rate $K_\eta e_\eta$, and the vertical tracking error rate $K_h e_h$ are supplied by a gain block 44 based on the tracking error $e^{NED}$. (The gains $K_\xi$, $K_\eta$, and $K_h$, for example, may be 0.25 rad/s, 0.25 rad/s, and 0.125 rad/s, respectively.) The tracking errors $e_\xi$, $e_\eta$, and $e_h$ are the North, East, and down components of $e^{NED}$.

The position error rates $\xi_{dot}^{d}$, $\eta_{dot}^{d}$, and $h_{dot}^{d}$ are input into inverted dynamic equations at a block 48 in order to calculate ground speed $v^c$, track angle $\chi^c$, and flight path angle $\gamma^c$ that are required to follow the desired ground speed, track angle, and geometric altitude while at the same time maintaining the desired spacing between aircraft. Accordingly, at block 48 dynamic inversion is implemented by calculating the ground speed $v^c$, track angle $\chi^c$, and flight path angle $\gamma^c$ according to the following equations:

$$v^c = \text{sign}\sqrt{(\xi_{dot}^{d})^2 + (\eta_{dot}^{d})^2 + (h_{dot}^{d})^2} \quad (7)$$

$$\text{sign} = 1 \text{ if } |X^{c'}| \leq \pi/2 \quad (8)$$
$$= -1 \text{ if } |X^{c'}| > \pi/2$$

$$\chi^{c'} = \tan^{-1}(\eta_{dot}^{d}\xi_{dot}^{d}) \quad (9)$$

$$X^c = X^{c'} \text{ if } |X^{c'}| \leq \pi/2 \quad (10)$$
$$= \pi - X^{c'} \text{ if } |X^{c'}| > \pi/2$$

$$\gamma^c = \sin^{-1}(h_{dot}^{d}/v^c) \quad (11)$$

The quadrant checks in equations (8) and (10) prevent the own aircraft from turning in order to slow down. In general, the own aircraft should use speed only if it is too close longitudinally. The ground speed $v^c$, track angle $\chi^c$, and flight path angle $\gamma^e$ represent the state that the own-ship should be following in order to simultaneously maintain the desired spacing. In one embodiment, the ground speed $v^c$, track angle $\chi^c$, and flight path angle $\gamma^c$ are provided by the flight plan from the FMS 24. In an alternate embodiment, they are provided by other aircraft systems.

At a second adder 48 the current ground speed v, the current track angle x, and the current flight path angle γ is subtracted from the required states $v^c$, $\chi^c$, and $\gamma^e$. The current ground speed v, the current track angle $\chi$, and the current flight path angle γ are provided by the on-board navigation system. Gains $K_\alpha$, $K_\chi$, and $K_\gamma$, are applied by a gain block 50 to the output of the second adder 49 and are limited by a limiter 52 in order to produce a ground speed rate $v_{dot}^{t}$, a track rate $\chi_{dot}^{t}$, and a flight path angle rate $\gamma_{dot}^{t}$ according to the following equations:

$$\gamma_{dot}^{t} = K_\gamma(\gamma^c - \gamma) \quad (12)$$

$$v_{dot}^{t} = K_v(v^c - v) \quad (13)$$

$$\chi_{dot}^{t} = K_\chi(\chi^c - \chi) \quad (14)$$

$K_v$, $K_\chi$, and $K_\gamma$, may have values, for example, of 0.5 rad/s, 0.25 rad/s, and 0.5 rad/s, respectively. These values are normally determined through engineering judgment using a combination of analysis and simulation. If the current ground speed v, the current track angle $\chi$, and the current flight path angle γ are the same as the required states $v^c$, $\chi^c$ and $\gamma^c$ then $v_{dot}^{t}$, $\chi_{dot}^{t}$, and $\gamma_{dot}^{t}$ will be zero.

The speed rate $v_{dot}^{t}$, the heading or track rate $\chi_{dot}^{t}$, and the flight path angle rate $\gamma_{dot}^{t}$ are added to the commanded speed rate $v_{dottrack}$, the commanded track rate $\chi_{dottrack}$, and the commanded flight path angle rate $\gamma_{dottrack}$ at a third adder 54 according to the following equations:

$$v_{dot}^{d} = v_{dot}^{t} + v_{dottrack} \quad (15)$$

$$\chi_{dot}^{d} = \chi_{dot}^{t} + \chi_{dottrack} \quad (16)$$

$$\gamma_{dot}^{d} = \gamma_{dot}^{t} + \gamma_{dottrack} \quad (17)$$

The commanded speed rate $v_{dottrack}$, the commanded heading or track rate $\chi_{dottrack}$, and the commanded flight path angle rate $\gamma_{dottrack}$ include commanded accelerations, which are zero during nominal position keeping but can be nonzero if a commanded maneuver, such as a speed change, a turn, or an altitude change, is commanded. Thus, if the aircraft is to execute a commanded speed change, for example, the acceleration $v_{dottrack}$ is commanded before any errors in the spacing geometry (which will appear through the position tracking error $e^{NED}$) or errors in tracking the track angle, ground speed, or flight path angle (which will appear through $\xi_{dot}^{t}$, $\eta_{dot}^{t}$ and/or $h_{dot}^{t}$) are seen. Using this feedforward information improves tracking performance, although the guidance laws implemented by the processor 12 will work without it. In one embodiment, the commanded accelerations would be provided by the flight plan from the Flight Management System 24.

Before the commanded accelerations $v_{dot}^{d}$, $\chi_{dot}^{d}$, and $\gamma_{dot}^{d}$ are passed to the autopilot or are used to calculate display outputs, they are limited at a limiter 56. The limits on the commanded accelerations could be constants or they could be calculated using a dynamic model for the own aircraft. When using a dynamic model for the own aircraft, the limits on the commanded accelerations $v_{dot}^{d}$, $\chi_{dot}^{d}$, and $\gamma_{dot}^{d}$ are calculated using a model of the autopilot and expected performance limits on the bank angle µ, the thrust T, and the angle of attack α. The aircraft equations of motion for an aircraft are given by the following equations:

$$mv_{dot} = D + T \cos(\alpha) - mg \sin(\gamma) \quad (18)$$

$$mv \cos(\gamma)\chi_{dot} = (L + T \sin(\alpha))\sin(\mu) \quad (19)$$

$$mv\gamma_{dot} = (L+T\sin(\alpha))\cos(\mu) - mg\cos(\gamma) \qquad (20)$$

where D is drag, T is thrust, m is mass, g is gravity, and L is lift. The autopilot model is determined by dynamically inverting the equations of motion to solve for the controls $\mu_c$, $T_c$, and $\alpha_c$ and is given by the following equations:

$$\mu_c = \tan^{-1}(v\cos(\gamma)\chi_{dot}^d)/(v\gamma_{dot}^d + g\cos(\gamma)) \qquad (21)$$

$$T_c = (mv_{dot}^d + D + mg\sin(\gamma))/\cos(\alpha_c) \qquad (22)$$

$$\tan(\alpha_c) = ((mv\gamma_{dot}^d + mg\cos(\gamma))/\cos(\mu_c) - L)/(mv_{dot}^d + D + mg\sin(\gamma)) \qquad (23)$$

L and D are modeled according to the following equations:

$$L = qSC_L \qquad (24)$$

$$D = qSC_D \qquad (25)$$

$$C_L = C_{L\alpha 0} + C_{L\alpha}\alpha \qquad (26)$$

$$C_D = C_{Dmin} + KC_L^2 \qquad (27)$$

where q is dynamic pressure available from an air data system, S is surface area of the wing, $C_L$ is the coefficient of lift, $C_D$ is the coefficient of drag, $C_{L\alpha 0}$ is the lift curve y intercept, $C_{L\alpha}$ is the lift curve slope, $C_{Dmin}$ is the drag polar minimum, and K is the drag polar coefficient. Let it be assumed that the performance limits on the bank angle $\mu$ are $\mu_{min\text{-}limit}$ and $\mu_{max\text{-}limit}$, that the performance limits on the thrust T are $T_{min\text{-}limit}$ and $T_{max\text{-}limit}$, and that the performance limits on the angle of attack $\alpha$ are $\alpha$ are $\alpha_{min\text{-}limit}$ and $\alpha_{max\text{-}limit}$. Let it further be assumed that the unlimited rates are denoted $v_{dot}^{d'}$, $\chi_{dot}^{d'}$, and $\gamma_{dot}^{d'}$.

First, the unlimited track angle rate $\chi_{dot}^{d'}$ is limited as follows. $\mu'_c$ is calculated from equation (21) using the unlimited track angle rate $\chi_{dot}^{d'}$ and the unlimited flight angle path rate $\gamma_{dot}^{d'}$ according to the following equation:

$$\mu'_c = \tan^{-1}(v\cos(\gamma)\chi_{dot}^{d'})/(v\gamma_{dot}^{d'} + g\cos(\gamma)) \qquad (28)$$

If $\mu'_c$ is inside the bank angle limits of $\mu_{min\text{-}limit}$ and $\mu_{max\text{-}limit}$, then the limited track angle rate $\chi_{dot}^d$ is given by the following equation:

$$\chi_{dot}^d = \chi_{dot}^{d'} \qquad (29)$$

If $\mu'_c$ is outside the bank angle limits of $\mu_{min\text{-}limit}$ and $\mu_{max\text{-}limit}$ it may be assumed that the bank angle limit is exceeded due to an excessive desired track angle rate (i.e., turn rate) $\chi_{dot}^d$ rather than to an excessive climb rate $\gamma_{dot}^d$. The turn rate $\chi_{dot}^d$ is calculated by rearranging equation (21) and by substituting $\mu_{lim}$ for $\mu$ according to the following equation:

$$\chi dot^d = (\tan(\mu_{lim})(v\gamma_{dot}^{d'} + g\cos(\gamma)))/v\cos(\gamma) \text{ where} \qquad (30)$$

$$\mu_{lim} = \mu_{min} - \text{limit if } \mu'_c > \mu_{min} - \text{limit} \qquad (31)$$
$$= \mu_{max} - \text{limit if } \mu'_c > \mu_{max} - \text{limit}$$

Second, the unlimited acceleration $v_{dot}^{d'}$ and the unlimited climb rate $\gamma_{dot}^{d'}$ are limited as follows. $\mu_c$ is calculated using equation (21) with $\chi_{dot}^d$ as given above according to the following equation:

$$\mu_c = \tan^{-1}(v\cos(\gamma)\chi_{dot}^d)/(v\gamma_{dot}^{d'} + g\cos(\gamma)) \qquad (32)$$

Next $T'_c$ and $\alpha'_c$ are calculated using equations (22) and (23) and $\mu_c$ and by substituting $v_{dot}^{d'}$ and $\gamma_{dot}^{d'}$ for $v_{dot}^d$ and $\gamma_{dot}^d$.

There are four situations (A, B, C, and D) to consider. In situation A, if $T'_c$ as so calculated is within the thrust limits $T_{min\text{-}limit}$ and $T_{max\text{-}limit}$, then the limited acceleration $v_{dot}^d$ is given by the following equation:

$$v_{dot}^d = v_{dot}^{d'} \qquad (33)$$

In situation B, if $T'_c$ as calculated above is outside the thrust limits $T_{min\text{-}limit}$ and $T_{max\text{-}limit}$, it may be assumed that this situation has been caused by a command for an excessive acceleration $v_{dot}^{d'}$. Using the approximation that the angle of attack $\alpha$ is a small angle, equation (20) is solved for $\alpha'_c$ by substituting $\gamma_{dot}^{d'}$ for $\gamma_{dot}^d$ and $T_{lim}$ for T to produce the following equation:

$$\alpha'_c = ((mv\gamma_{dot}^{d'} + mg\cos(\gamma))/\cos(\mu_c) - C_{L\alpha 0}qS)/C_{L\alpha}qS + T_{lim}) \qquad (34)$$

Equation (18) is solved for the limited acceleration $v_{dot}^d$ using equations (25), (26), and (27), where $\alpha_c$ is substituted for $\alpha$ and $T_{lim}$ is used for T to produce the following equation:

$$v_{dot}^d = (-D + T_{lim}\cos(\alpha'_c) - mg\sin)/m \text{ where} \qquad (35)$$

$$C_L = C_{L\alpha 0} + C_{L\alpha}\alpha'_c \qquad (36)$$

$$T_{lim} = T_{min\text{-}limit} \text{ if } T'_c < T_{min\text{-}limit} \qquad (37)$$
$$= T_{max\text{-}limit} \text{ if } T'_c > T_{max\text{-}limit}$$

In situation C, if $\alpha'_c$ is within the angle of attack limits $\alpha_{min\text{-}limit}$ and $\alpha_{max\text{-}limit}$, then the limited climb rate $\gamma_{dot}^d$ is given by the following equation:

$$\gamma_{dot}^d = \gamma_{dot}^{d'} \qquad (38)$$

In situation D, if $\alpha'_c$ is outside the angle of attack limits $\alpha_{min\text{-}limit}$ and $\alpha_{max\text{-}limit}$ it may be assumed that acceleration has already been limited, if necessary, and that this situation is caused by a command for an excessive climb rate $\gamma_{dot}^{d'}$. The limited climb rate $\gamma_{dot}^d$ is calculated by rearranging equation (23) and by using equations (25), (26), and (27) to produce the following equation:

$$\gamma_{dot}^d = \qquad (39)$$
$$(((mv_{dot}^d + D + mg\sin(\gamma))\tan(\alpha_{lim}) + L)\cos(\mu_c) - mg\cos(\gamma))/mv$$
where $$C_L = C_{l\alpha 0} + C_{L\alpha}\alpha_{lim} \qquad (40)$$

$$\alpha_{lim} = \alpha_{min\text{-}limit} \text{ if } \alpha'_c < \alpha_{min\text{-}limit} \qquad (41)$$
$$= \alpha_{max\text{-}limit} \text{ if } \alpha'_c < \alpha_{max\text{-}limit}$$

An exemplary set of performance limits and other values for the C-130 are as follows: the bank angle limits are $\mu_{max\text{-}limit} = 45°$, $\mu_{min\text{-}limit} = -45°$; the angle of attack limits are $\alpha_{min\text{-}limit} = -7°$, $\alpha_{max\text{-}limit} = 20°$; the thrust limits are $T_{min\text{-}limit} = 0$, $T_{max\text{-}limit} = 66000$ lbf; the wing surface S is 1745 ft.$^2$; the lift curve y intercept $C_{L\alpha 0}$ is 0.3; the lift curve slope $C_{L\alpha}$ is 4.5 per radian; the drag polar minimum $C_{Dmin}$ is 0.025; and the drag polar coefficient K is 0.04. As discussed above, dynamic pressure q is provided by an air data computer. The mass m is determined as W/g, where W is a default weight of the aircraft.

The commanded accelerations $v_{dot}^d$, $\chi_{dot}^d$, and $\gamma_{dot}^d$ represent the corrections that are necessary to maintain spacing and track state and to implement any commands. The commanded accelerations $v_{dot}^d$, $\chi_{dot}^d$, and $\gamma_{dot}^d$ as limited by the limiter 56, and the vertical position rate $h_{dot}^t$ from the block 40 are passed to the guidance display 18 or they may be passed to the autopilot 24 for automatic corrections. The commanded accelerations $v_{dot}^d$, $\chi_{dot}^d$, and $\gamma_{dot}^d$ as limited by the limiter 56 are also supplied to a block 58 for calculation of other display outputs. For example, a commanded speed guidance $v_c$ and a commanded flight path angle guidance $\gamma_c$ are calculated by integrating $v_{dot}^d$ and $\gamma_{dot}^d$ according to the following equations:

$$v_c = v + \int v_{dot}^d \quad (42)$$

$$\gamma_c = \gamma + \int \gamma_{dot}^d \quad (43)$$

Also, as shown in the block 58 of FIG. 3, commanded bank angle guidance $\mu_c$, thrust $T_c$, and angle of attack $\alpha_c$ are calculated according to equations (21), (22), and (23). The commanded accelerations $v_{dot}^d$, $\chi_{dot}^d$, and $\gamma_{dot}^d$, the bank angle guidance the thrust guidance $T_c$, the angle of attack guidance $\alpha_k$, the ground speed guidance $v_c$, and the flight path angle guidance $\gamma_c$ are combined with the flight plan information (the commanded track angle $\chi_{FP}$ or the commanded heading $\Psi_{FP}$, the commanded ground speed $v_{FP}$ or the commanded air speed $vas_{FP}$, and the commanded geometric altitude $h_{FP}$ or the barometric altitude $hbaro_{FP}$), the lateral, longitudinal and vertical deviations from the TTF position, the track climb rate $h_{dot}^t$, and other information in order to provide guidance to the pilot, the flight management system, and/or the autopilot. Immediately below is a description of how the display outputs can be used to maintain spacing.

There are a number of possible outputs from the processor 12. These outputs may be used in different ways, depending on the flight situation. In general, a pilot has three options when flying, which are referred to herein as flight modes. First, in a manual flight director mode, the pilot flies manually using guidance cues to track the desired speed, heading, and altitude while also maintaining the desired spacing. Second, in an autopilot select mode, speed, heading, or altitude are provided to the autopilot or autothrottle which controls the speed of the aircraft automatically. Third, in an autopilot coupled mode, all flight commands are automatically provided to the autopilot and autothrottle either directly or through the FMS 24.

Each of these flight modes can be used for any combination of turn, speed change, and/or altitude change. How each procedure will be flown depends on the equipment of the aircraft and flight crew preferences. For example, an aircraft that does not have an autothrottle cannot command speed in the autocoupled flight mode. The position keeping guidance display is used for both manual flight and to provide the necessary values for the autopilot during autopilot select flight. It may also be useful during autocoupled flight to maintain situational awareness.

To manually control longitudinal position and speed, the guidance display(s) can include one or more of the following: the longitudinal position tracking error component of $e^{PK}$, the ground speed guidance $v_c$, and the acceleration guidance $v_{dot}^d$. For manual lateral guidance, the guidance display(s) can include one or more of the following: the lateral position tracking error component of $e^{PK}$, the bank angle guidance $\mu_c$ and the flight plan track angle $\chi_{FP}$ or the flight plan heading $\Psi_{FP}$. For manual vertical guidance, the guidance display(s) can include one or more of the following: the flight plan altitude $h_{FP}$, the target climb rate $h_{dot}^t$, and the flight path angle guidance $\gamma_c$. Which variables will be displayed depends on pilot preferences and display limitations. If desired, the inertial quantities can be converted to air mass referenced quantities. For example, the ground speed guidance $v_c$ can be converted to an air speed guidance.

In the autopilot select flight mode, the pilot flies by providing commands to the autopilot and/or autothrottle. For longitudinal/speed guidance, the pilot manually inputs the ground speed guidance $v_c$ (or converted air speed guidance) from the guidance display. For lateral guidance, the pilot inputs the flight plan heading $\Psi_{FP}$ or the flight plan track angle $\chi_{FP}$ into the autopilot. Alternatively, the pilot can input a heading or track angle to make the aircraft match the commanded bank angle guidance $\mu_c$. It should be noted that, in most autopilots, the bank angle or turn rate cannot be specified in addition to the commanded heading and track angle. Thus, the own-ship cannot track perfectly during a turn when using the autopilot for lateral guidance. For vertical guidance, the pilot inputs the flight plan altitude $h_{FP}$ into the autopilot. The target climb rate or flight path angle guidance may also be specified.

In the autopilot coupled flight mode, it is possible to fly hands off while maintaining spacing. The automatic guidance is provided to the autopilot directly or through the FMS 24 as follows: longitudinal/speed guidance is provided to the autothrottle by $v_c$; lateral guidance is provided to the autopilot by $\mu_c$; and vertical guidance is provided to the autopilot with $h_c$ and $h_{dot}^t$ (or the equivalent flight path angle $\gamma_c$). The interface details depend on each autopilot or FMS implementation.

The track velocity ($v_{track}$, $\chi_{track}$, and $\gamma_{track}$), the commanded track rates ($v_{dottrack}$, $\chi_{dottrack}$, and $\gamma_{dottrack}$), and the tracking error (e) are inputs to the position guidance law calculations performed by the processor 12. In order to make the position guidance law calculations described above, the track velocity, the commanded track rates, the tracking error, and other variables need to be expressed with consistent reference frames and clear definitions relative to the desired spacing.

Spacing is defined as a relative distance between the own-ship and the TTF. The nominal position separation distance is defined as vector $\Delta x_{nom}$ (with components $\Delta x_{nom}$, $\Delta y_{nom}$, and $\Delta z_{nom}$). That is, this vector represents the separation distance that is desired during in-trail following or merging procedures. To be able to specify values for the distance vector $\Delta x_{nom}$, this distance vector should be defined with respect to a reference frame. The reference frame for this purpose is called the position keeping reference frame and is denoted $()^K$. The position keeping reference frame is centered on the own-ship and its x axis is along a reference angle designated as $\Psi_{PK}$, which is measured clockwise from North. In one embodiment, $\Delta x_{nom}$ can be defined in terms of a minimum distance (i.e. "at least" spacing) instead of a specific distance.

The definition of the reference heading $T_N$ (for the PK reference frame is important. There are four possible definitions of the position keeping reference frame. (1) If $\Psi_N = \Psi$, the tracking errors are referenced along the heading of the own-ship. (2) If $\Psi_{PK} = \Psi_{FP}$, the tracking errors are referenced to the heading that the own-ship should be tracking as provided by the flight plan. (3) If $\Psi_{PK} = \chi$, the tracking errors are referenced along the current track of the own-ship. (4) If $\Psi_{PK} = \chi_{FP}$, the tracking errors are referenced to the track angle that the own-ship should be tracking as provided by the flight plan. In one embodiment, the flight plan information is provided by the FMS. In another embodiment, the flight plan information is provided by the flight control system. When the positionkeeping reference frame is referenced to flight plan information, the position error calculations are less sensitive to small variations in own-ship track angle or heading.

Figure 4:
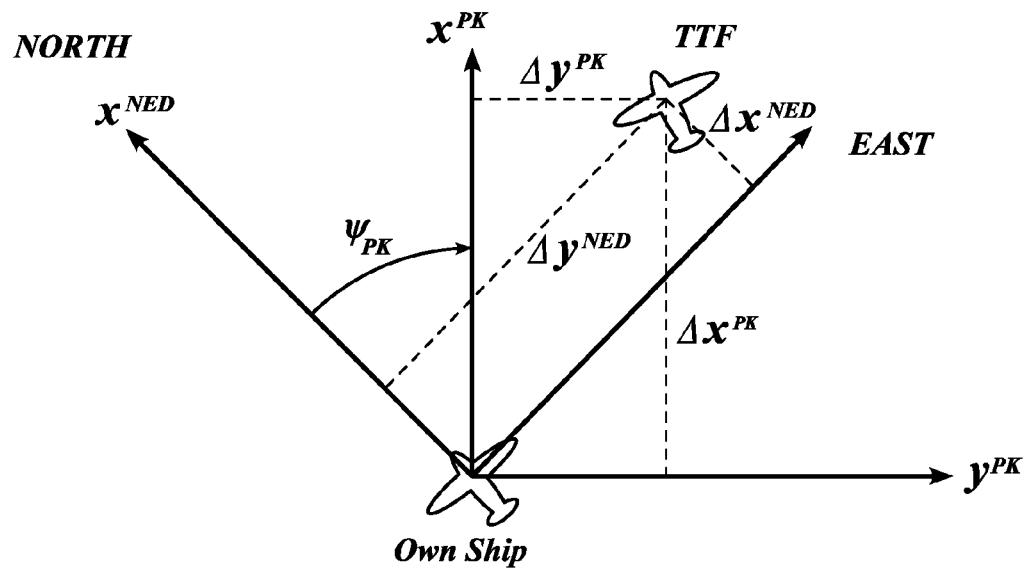
FIG. 4 is a perspective view showing a North, East, Down (NED) inertial reference frame.

The other reference frame that is used frequently is the North East Down reference frame. For example, the position tracking error $e^{NED}$ that is input into the position keeping guidance laws at the gain block 44 as shown in FIG. 4 is expressed in the North East Down frame. The North East Down frame is an inertial reference frame, with the x-axis along North, the y-axis along East, and the z-axis pointing down. It is the reference frame in which GPS velocity is often represented. The track errors may be transformed to the North East Down frame prior to being input to the guidance equations described above in relation to FIG. 4. In the dynamic equations for the aircraft, $\xi$ is North position, $\eta$ is East position, and h is altitude. These positions can also be represented according to the following equations:

$$\xi = X^{NED} \quad (45)$$

$$\eta = Y^{NED} \quad (46)$$

$$h = Z^{NED} \quad (47)$$

As discussed above, the PK frame is the frame used to compute the lateral, longitudinal, and vertical tracking errors. The x-axis and the y-axis are in a locally level plane, and the z-axis is down. The angle between the x-axis of the PK frame and the x-axis of the North East Down frame is $\Psi_{PK}$, and the PK frame is related to the North East Down frame by rotation about the $z^{NED}$ by $\Psi_{PK}$.

The position tracking error vector used by the guidance calculations is $e^{NED}$, which is calculated from the vector $e^{PK}$ by a coordinate transformation.

Although the guidance command calculations use ground speed $v_{track}$, track, angle $\chi_{track}$, and geometric altitude h, the commanded instructions are specified in terms of either air speed or ground speed, either heading or track angle, and/or either geometric or barometric altitude, and converted as needed.

The specific position keeping guidance calculation inputs are determined based on the specific in-trail following or merging scenario. The present invention includes position keeping algorithms that allow the own-ship to maintain in-trail spacing with the TTF given the desired spacing interval and the reported position of each aircraft. There are a variety of scenarios where spacing is maintained, i.e. during climbs, descents and/or turns. In particular, the following types of in-trail situations are considered: in-trail following at constant altitude, in-trail following with altitude changes, in-trail following with heading or track changes, and in-trail following with combined altitude and heading or track changes. The track velocity and track rate calculations for the above-referenced situations are summarized in FIGS. 7-1, 7-2, and 7-3, and the tracking position error calculations for the above-referenced situations are summarized in FIGS. 8-1 and 8-2 and are discussed in more detail below.

Figure 5:
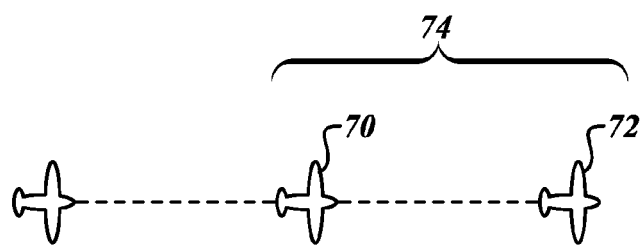
FIG. 5 is a top view showing in-trail following aircraft.
Figures 1, 6:
Figures 2, 6:
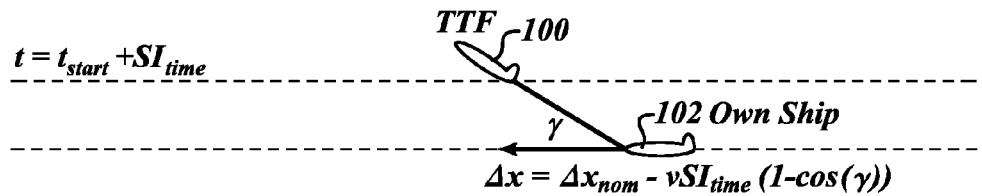
Figures 3, 6:
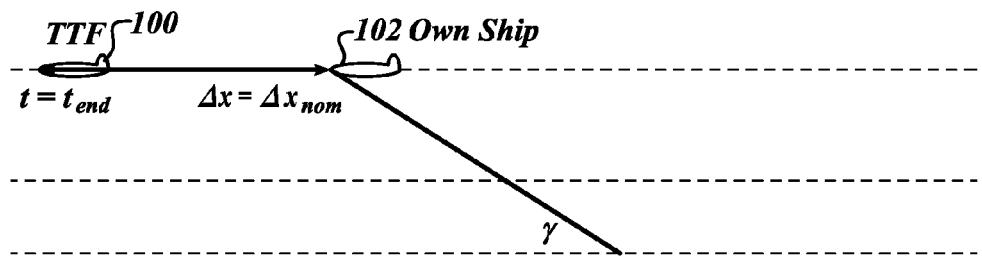

FIG. 5 shows an example in-trail spacing situation. A first aircraft 70 (own-ship), is positioned behind a second aircraft 72 (TTF). A relationship 74 is defined between the first aircraft 70 and the second aircraft 72. In one embodiment, the relationship 74 is defined in terms of time denoted $SI_{time}$ and/or distance $SI_{dist}$. If the system is provided with $SI_{time}$, it can always be converted to $SI_{dist}$ using aircraft ground speed v as $$SI_{time} = SI_{dist}/v \quad (47)$$

If the system is provided with $SI_{dist}$, it can always be converted to a $SI_{time}$ using $$SI_{dist} = vSI_{time} \quad (47)$$

In one embodiment, the first aircraft 70 is responsible for monitoring its positions relative to the second aircraft 72 and for making the necessary guidance adjustments based on information determined by the processor 12.

For in-trail following at a constant altitude and heading or track angle, the tracking position error can be calculate by considering the position of own-ship at the current time and the position of the TTF at the current time. The difference in own-ship and TTF position is compared to $SI_{dist}$. If the spacing is supposed to be "at least", no correction is made if own-ship is behind where it is supposed to be. If own-ship is flying a heading-based route then heading $\Psi$ or $\Psi_{FP}$ is used to do the reference frame conversion to convert $e^{PK}$ to $e^{NED}$. If own-ship is flying a track-based route then track angle $\chi$ or $\chi_{FP}$ is used to do the reference frame conversion to convert $e^{PK}$ to $e^{NED}$. The track velocity is either the current speed v and current track angle $\chi$ or the flight plan speed $v_{FP}$ and flight plan track angle $\chi_{FP}$. There is no commanded acceleration.

The tracking position error can also be calculated by considering the position of own-ship at the current time and the position of the TTF at the current time minus $SI_{time}$. This approach may have an advantage when current surveillance information for the TTF is not available or the surveillance information has dropouts and position is estimated through interpolation. Performance is improved if the reference frame conversion is performed using flight plan data from the FMS 24 or autopilot 26 instead of current track angle or heading data from the aircraft systems 18.

FIGS. 6-1, 6-2, and 6-3 show an in-track following situation with altitude changes but constant heading or track angle. At the location where a TTF 100 initiates an altitude change (i.e. $t = s_{tart}$), an own-ship 102 is following by a spacing interval SI behind the TTF 100, FIG. 6-1. When performing in-trail following, own-ship periodically checks whether TTF 100 is performing an altitude change by monitoring TTF altitude or receiving TTF flight plan information via the datalink 14. Once an altitude change is detected at time $t_{start-man}$, own-ship starts to track to a different spacing to ensure that it starts the altitude change at the same longitudinal position where the TTF when it started the altitude change. Once own-ship reaches the same longitudinal position as the TTF was when it started the altitude change, own-ship tracks the previous position of the TTF. Own-ship resumes default in-trail following once own-ship altitude change is complete.

Two sets of equations are utilized for the inputs into the guidance block shown in FIG. 3. The first equation is used until the own-ship 102 initiates an altitude change. The second set of equations is used by the own-ship 102 after both the own-ship 102 and the TTF 100 have initiated an altitude change. In one embodiment, the speed guidance is suppressed once the TTF 100 has started climb or descent but the own-ship 102 has not. In the situation set forth in FIGS. 8-1 thru 8-3, spacing performance is improved if the reference frame conversion is performed using flight plan data from the FMS or autopilot instead of the data from the aircraft systems 18.

Additionally, spacing can be maintained during in-trail following with changes to heading or track angle with constant altitude of the TTF or altitude changes to the TTF. When performing in-trail following, the own-ship periodically checks whether the TTF is performing a turn. In one embodiment, the own-ship detects a heading or track angle change in the TTF by monitoring TTF horizontal position and velocity via the datalink 14. In another embodiment, the own-ship receives TTF flight plan information via the datalink 14. The own-ship could also expect the heading or track change if such a change is inherent to the particular route traveled by the own-ship. Once a turn is detected at time $t_{startman}$, own-ship tracks to the position of the TTF at the start of the turn. Once own-ship reaches the same longitudinal position as TTF, own-ship tracks the previous position of the TTF until own-ship completes the turn. Like the altitude change situation discussed above, two sets of equations are utilized for the inputs into the guidance block shown in FIG. 3. The first equation applies until the own-ship initiates a turn. The second set of equations applies after both the own-ship and the TTF have initiated a turn.

Figure 9:
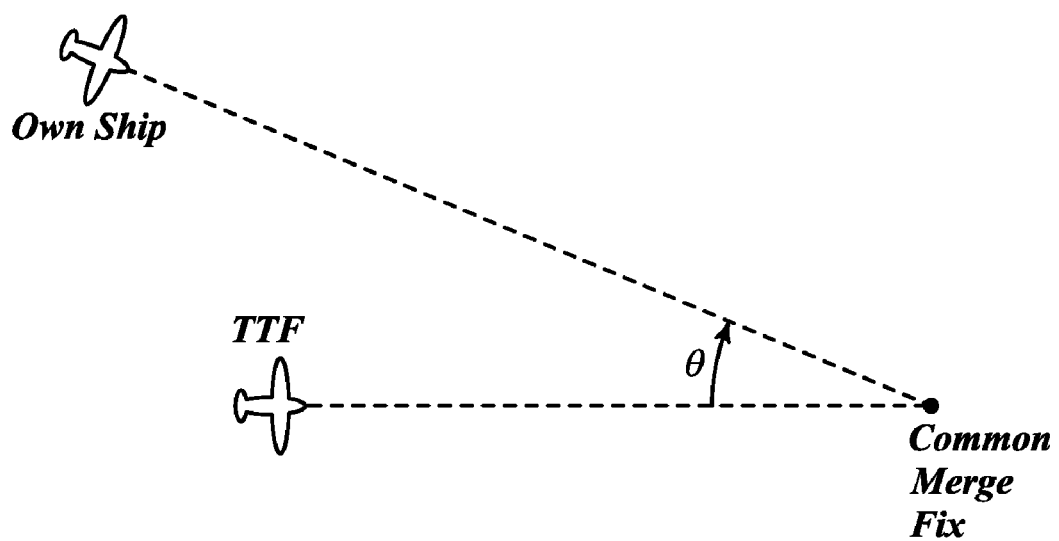
FIG. 9 is a top view showing spacing during merging.

Additionally, spacing can be maintained when two aircraft are flying to a common merge point whether on the same flight path or a different flight path. FIG. 9 shows a top view of two aircraft that are flying to the same merge point $x_{MP}$. Merging operations are typically done at constant altitude. During merging operations, it may be desirable to adjust spacing such that own ship and traffic are separated by a certain time $SI_{time}$ or distance $SI_{dist}$ once own-ship crosses the merge point and own-ship and TTF are on the same flight path. The spacing error is calculated by (a) taking the distance between the TTF and merge point MP, denoted $x_{TTF}$-$x_{MP}$; (b) rotating it clockwise through the angle θ, where θ as depicted in FIG. 9 is the angle between the line from the TTF to the merge point and a line from own-ship to the merge point and C is the direction cosine matrix used to perform the three-dimensional transformation; and (c) subtracting the distance between own-ship and the merge point, denoted x-$x_{MP}$. The track velocity is either the current speed v and current track angle χ or the flight plan speed $v_{FP}$ and flight plan track angle $χ_{FP}$. There is no commanded acceleration.

Finally, the desired spacing between an own-ship and a TTF may be adjusted during flight. It is always possible to change the spacing interval during any of the in-trail spacing or merging operations. This causes an immediate increase in the horizontal position error. With large horizontal spacing errors, the aircraft tend to overshoot the correct spacing. When multiple aircraft are performing in-trail following or merging procedures, this can cause the aircraft to overfly the TTF, causing a collision or near-collision.

To prevent degraded tracking performance, the change in spacing interval is done differently than standard in-trail following. The horizontal position error is set to zero and the $v_{track}$ is set to the speed of the TTF plus or minus a procedural speed change $Δv_c$. The procedural speed change is added for an increase in spacing interval and subtracted for a decrease in spacing interval. The horizontal position error is monitored and once it decreases beneath a preset threshold, normal in-trail following or merging proceeds. The same approach is used to handle other large changes in horizontal spacing error, such as when own-ship initially starts a merging or in-trail following procedure.

As discussed above, displays may be used by the spacing system 10 to convey information back to the pilots and operators. There are three classifications for these displays: (1) guidance displays; (2) position traffic displays; and (3) displays that carry general information about the system. These displays can reside on a variety of hardware devices. The TA/VSI display is a dedicated display device that accompanies traditional TCAS systems. The specific output is determined by the control unit and can include guidance cues as well as position traffic information.

The spacing system 20 generates a wealth of information that could be displayed to the pilot. This information includes the following: (i) the ground speed guidance $v_c$ converted to air speed guidance $vas_c$ or Mach number guidance $M_c$; (ii) the bank angle guidance $μ_c$; (iii) the relative spacing between TTF and own-ship expressed as a distance and/or time; (iv) the relative altitude between TTF and own-ship; (v) the relative speed between the TTF and the own-ship; (vi) the TTF ground speed, air speed, heading, track angle, bank angle, geometric and/or barometric altitude.

Guidance information can be conveyed to the pilot many different ways. One approach is to use the flight director, which can be part of the primary flight display (PFD) or part of a separate attitude direction indicator (ADI). Guidance cues such as speed (ground speed $v_c$, air speed $vas_c$, flight plan ground speed $V_{FP}$, or flight plan air speed $vas_{FP}$), altitude ($h_{FP}$ or $h_{TTF}$), and heading targets ($Ψ_{FP}$ or $χ_{FP}$) can be displayed. Vertical and lateral guidance bars are available to inform the pilot of lateral and longitudinal position errors. The longitudinal position error is not typically displayed graphically on the PFD because it does not fit naturally into the framework of current PFDs. If desired, however, such graphical displays can be added to the spacing mode of the PFD/EADI. The display format may be different from that of a traditional PFD, but the equivalent information can be displayed. Guidance information can also be displayed on the dedicated TCAS TA/VSI display.

Traffic displays provide a plan form view of other aircraft with respect to a pilot's own-ship. This display may be shown on the secondary display unit of an electronic flight information system, or it may be shown as one of the display modes of the TA/VSI. In one embodiment, the pilot's own-ship at the center of the display and the TTF will be designated. Range rings and/or adjustable range scales assist pilots in determining relative horizontal ranges. For vertical reference, numbers and arrows adjacent to the symbols display relative altitude and altitude rates of the other aircraft. Guidance information for the spacing system, such as speed guidance, may also be displayed.

Certain modifications of the present invention have been discussed above. Other modifications will occur to those practicing in the art of the present invention. For example, the present invention also applies to other types of vehicles, such as rotorcraft. Also, it is possible for the own-ship to track a virtual or imaginary TTF whose position or trajectory is calculated or provided by another vehicle or ground station. In another example, the virtual TTF could be a four-dimensional trajectory (three dimensions related to position and one dimension for time) that is provided before flight or that is datalinked from another vehicle or a ground station.

Furthermore, the guidance logic that calculates the thrust $T_c$, the bank angle $μ_c$, and the angle of attack $α_c$ is based on dynamically inverting a set of equations of motion for an aircraft. Similar equations are used in the limiter 56. These equations of motion do not include the effects of wind. However, it is straightforward to invert equations of motion for an aircraft that include wind in order to produce associated equations for the thrust $T_c$, the bank angle $μ_c$, and the angle of attack $α_c$ inclusive of wind.

Also, in order to calculate the controls for a different vehicle, that vehicle's equations of motion would be substituted for the aircraft equations of motion, and the associated controls for the guidance block 58 would be calculated by inverting those equations of motion. For example, the equations of motion for a land vehicle are different than for an aircraft, since the principles of motion are different. A land vehicle's controls would include throttle, which is analogous to thrust, and steering angle, which is analogous to bank angle, but not vertical control like flight path angle since the vehicle follows the ground.

It should be understood by one of ordinary skill in the art that there is flexibility in the present invention to command ground speed or air speed, track angle or heading, and geometric altitude or barometric altitude. Ground speed could be converted into other reference frames and could be utilized such as true airspeed, indicated airspeed, or Mach number. Different reference frames could be used for position, such as an Earth-Centered-Earth-Fixed reference frame. Also, much of the above description is based on inertial quantities. However, if desired, inertial quantities can be converted easily to air mass referenced quantities. Therefore, inertial referenced quantities and air mass referenced quantities are used interchangeably herein.

Additionally, in one embodiment of the present invention, each vehicle computes its own guidance corrections. In an alternative embodiment, the guidance corrections are calculated on the ground or on board other aircraft, and these guidance corrections are transmitted as guidance commands via a datalink.

In one embodiment, the position keeping system 10 is implemented in software executed by a computer. In other embodiments, the position keeping system 10 is implemented in hardware such as programmable logic arrays or in other digital processing circuitry.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method of keeping position of a first vehicle relative to a second vehicle, the method comprising:
    at the first vehicle:
        acquiring a track velocity input based on information regarding the second vehicle;
        acquiring a tracking position error input;
        determining a velocity output based on the track velocity input and the tracking position error input,
    wherein the determining the velocity output indicates a velocity to substantially maintain the first vehicle in a position relative to the second vehicle,
    wherein the determining of a velocity output comprises performing a dynamic inversion based on the track velocity input and the position error input;
        converting the velocity output to an acceleration output;
        acquiring an acceleration input; and
        determining guidance commands based on the acceleration output and the acceleration input,
    wherein the track velocity input comprises: track ground speed $v_{track}$, track angle $\chi_{track}$, and track flight path angle $\gamma_{track}$,
    wherein the determined guidance commands includes a commanded acceleration that comprises: track ground acceleration $v_{dottrack}$, track angle rate $\chi_{dottrack}$, and track flight path angle rate $\gamma_{dottrack}$,
    wherein the tracking position error comprises: position difference $\Delta x^{PK}$, reference position difference $\Delta x_{REF}^{PK}$, a tracking position error $e^{PK}$, and a reference heading $\psi_{PK}$,
    wherein altitude, heading and track angle of the first vehicle and the second vehicle are constant, the track ground speed $v_{track}$ comprises at least one of current ground speed or flight plan ground speed, the track angle $\chi_{track}$ comprises at least one of current track angle or flight plan track angle, and the track flight path angle $\gamma_{track}$ is 0 during in-trail following tracking either at a current position of the second vehicle or a previous position of the second vehicle,
    wherein only the second vehicle has at least one of initiated the altitude, heading or track change, the track ground speed $v_{track}$ is based on a division of a difference in the position of the second vehicle when the altitude change started and the current position of first vehicle by a difference between the time the altitude change started and the current time, the track angle $\chi_{track}$ comprises at least one of the current track angle or the flight plan track angle, and the track flight path angle $\gamma_{track}$ is 0,
    wherein the first vehicle and second vehicle have initiated an altitude change, the track ground speed $v_{track}$ comprises at least one of the current ground speed or the flight plan ground speed, the track angle $\chi_{track}$ comprises at least one of the current track angle or the flight plan track angle, and the track flight plan angle $\gamma_{track}$ is based at least one of an angular relationship of a division of a current climb rate by the track ground speed or an angular relationship of a division of a planned climb rate by the track ground speed,
    wherein the first vehicle and second vehicle have initiated the heading or track change but no altitude change, the track ground speed $v_{track}$ comprises the ground speed of second aircraft at a time equal to the current time minus a desired spacing interval time, the track angle $\chi_{track}$ comprises the track angle of the second vehicle at a time equal to the current time minus a desired spacing interval time, and the track flight path angle $\gamma_{track}$ is 0,
    wherein the first vehicle and second vehicle have initiated the heading or track change but with an altitude change, the track ground speed $v_{track}$ comprises the ground speed of second vehicle at a time equal to the current time minus a desired spacing interval time, the track angle $\chi_{track}$ comprises the track angle of the second vehicle at a time equal to the current time minus a desired spacing interval time, and the track flight path angle $\gamma_{track}$ is based at least one of an angular relationship of a division of a current climb rate by the track ground speed or an angular relationship of a division of a planned climb rate by the track ground speed.

2. The method of claim 1 wherein at least some of velocity output includes a time delay, and wherein the time delay is equal to the time required for the first vehicle to cover a desired distance between the position of the first vehicle when the second vehicle begins the maneuver and the position of the second vehicle where the second vehicle begins the maneuver.

3. The method of claim 1, wherein the guidance commands comprise velocity guidance.

4. The method of claim 1, wherein the guidance commands comprise acceleration guidance.

5. The method of claim 1, further comprising displaying the guidance commands to an operator of the first vehicle.

6. The method of claim 1, wherein $v_{track}$=one of v or $v_{FP}$, $\chi_{track}$=one of $\chi$ or $\chi_{FP}$, and $\gamma_{track}$=0 during in-trail following during merging operations.

7. The method of claim 1, wherein $\Delta x^{PK}=C(x_{TTF}^{PK}(t)-x_{MP}^{PK})-(x^{PK}(t)-x_{MP}^{PK})$, one of $\Delta x_{ref}^{PK}=SI_{dist}$ or $v*SI_{time}$, one of $e^{PK}=\Delta x^{PK}-\Delta x_{ref}^{PK}$, 0, 0), $(\min(0,(\Delta x^{PK}-\Delta x_{ref}^{PK})),0,0)$, or (0, 0, 0), and one of $\psi_{PK}=\psi$, $\psi_{PK}=\chi$, $\psi_{PK}=\psi_{FP}$, and $\psi_{PK}=\chi_{FP}$ during merging operations.

8. A method of keeping position of a first vehicle relative to a second vehicle, the method comprising:
    at the first vehicle:
        acquiring a track velocity input based on information regarding the second vehicle;
        acquiring a tracking position error input;

determining a velocity output based on the track velocity input and the tracking position error input, wherein the determining the velocity output indicates a velocity to substantially maintain the first vehicle in a position relative to the second vehicle, wherein the determining of a velocity output comprises performing a dynamic inversion based on the track velocity input and the position error input;

converting the velocity output to an acceleration output;

acquiring an acceleration input; and determining guidance commands based on the acceleration output and the acceleration input, wherein the track velocity input comprises: track ground speed $v_{track}$, track angle $\chi_{track}$, and track flight path angle $\gamma_{track}$, wherein the determined guidance commands includes a commanded acceleration that comprises: track ground acceleration $v_{dottrack}$, track angle rate $\chi_{dottrack}$, and track flight path angle rate $\gamma_{dottrack}$, wherein the tracking position error comprises: position difference $\Delta x^{PK}$, reference position difference $\Delta x_{REF}^{PK}$, a tracking position error $e^{PK}$, and a reference heading $\psi_{PK}$, wherein when altitude, heading and track angle of the first vehicle and the second vehicle are constant, at least one of the first vehicle or second vehicle has initiated the altitude change, only the second vehicle has initiated the heading or the track change, the track ground acceleration $v_{dottrack}$, the track angle rate $\chi_{dottrack}$, and the track flight path angle rate $\gamma_{dottrack}$ are zero, wherein the first vehicle or second vehicle have initiated the heading or the track change, the track ground acceleration $v_{dottrack}$ and the track flight path angle rate $\gamma_{dottrack}$ are zero and the track angle rate $\chi_{dottrack}$ comprises at least one of flight plan track angle rate $\chi_{dotFP}$ or first vehicle angle rate $\chi_{dot}$.

9. A method of keeping position of a first vehicle relative to a second vehicle, the method comprising:

at the first vehicle:

acquiring a track velocity input based on information regarding the second vehicle;

acquiring a tracking position error input;

determining a velocity output based on the track velocity input and the tracking position error input, wherein the determining the velocity output indicates a velocity to substantially maintain the first vehicle in a position relative to the second vehicle, wherein the determining of a velocity output comprises performing a dynamic inversion based on the track velocity input and the position error input;

converting the velocity output to an acceleration output;

acquiring an acceleration input; and determining guidance commands based on the acceleration output and the acceleration input, wherein the track velocity input comprises: track ground speed $v_{track}$, track angle $\chi_{track}$, and track flight path angle $\gamma_{track}$, wherein the determined guidance commands includes a commanded acceleration that comprises: track ground acceleration $v_{dottrack}$, track angle rate $\chi_{dottrack}$, and track flight path angle rate $\gamma_{dottrack}$, wherein the tracking position error comprises: position difference $\Delta x^{PK}$, reference position difference $\Delta x_{ref}^{PK}$, a tracking position error $e^{PK}$, and a reference heading $\psi_{PK}$, wherein during constant altitude, heading and track angle of the first vehicle and the second vehicle while tracking current position of the second vehicle, the position difference comprises a difference between a position of the first vehicle and second vehicle at the current time, the reference position difference is the desired spacing interval expressed as a distance, the reference position difference comprises one of a desired spacing interval expressed in distance or time, the tracking position error comprises at least one of a difference between the position difference and the reference position distance or the minimum of zero and the difference between the position difference and the reference position distance, the reference heading is represented in at least one of a heading reference frame of the first vehicle, a heading reference frame of the second vehicle, a track reference frame of the first aircraft or a track reference frame of the second vehicle, wherein during constant altitude, heading and track angle of the vehicle while tracking previous position of the second first vehicle and the second vehicle, the position difference comprises a difference between the position of the second vehicle at the current time minus the desired time interval spacing and the position of first vehicle at the current time, the reference position comprises a difference is the desired spacing interval, the tracking position error is at least one of a difference between the position difference and the reference position distance or a minimum of zero and the difference between the position difference and the reference position distance, the reference heading is represented in at least one of a heading reference frame of the first vehicle, a heading reference frame of the second aircraft, a track reference frame of the first vehicle or a track reference frame of the second vehicle, wherein when only the second vehicle has initiated an altitude change, the position difference comprises a difference between the position of the second vehicle at the time an altitude change was initiated minus the position of first vehicle at the current time, the reference position difference comprises a product of the ground speed multiplied by the time since the altitude change started, the tracking position error comprises at least one of the difference between the position difference and the reference position difference, a minimum of zero or a difference between the position difference and the reference position distance, or zero, and the reference heading is represented in at least one of a heading reference frame of the first vehicle, a heading reference frame of the second aircraft, a track reference frame of the first vehicle or a track reference frame of the second vehicle, wherein during an altitude change of the first and second vehicle and second vehicle, the position difference comprises a difference between the position of the second vehicle at the current time minus the desired time interval spacing and the position of first vehicle at the current time, the reference position difference is zero, the tracking position error comprises one of a difference between the position difference and the reference position distance, the minimum of zero and the difference between the position difference and the reference position distance, the reference heading is represented in at least one of a heading reference frame of the first vehicle, a heading reference frame of the second vehicle, a track reference frame of the first vehicle or a track reference frame of the second vehicle, wherein only the second vehicle has initiated at least one of a heading or a track change, the position difference comprises a difference between the position of the second vehicle at the start of the heading or track change and the position of the first vehicle at the current time, the reference position difference comprises ground speed multiplied by the time since the heading or track change started, the tracking position error comprises at least one of the difference between the position difference and the reference position difference, a minimum of zero or a difference between the position difference and the reference position distance, or zero, and the reference heading is represented in at least one of a heading reference frame of the first vehicle, a heading reference frame of the second aircraft, a track reference frame of the first vehicle or a track reference frame of the second vehicle, and wherein during at least one of a heading or a track change where both the first and second vehicle and second vehicle have initiated the heading or track change, the position difference comprises a difference between the position of the second vehicle at the current time minus the desired time interval spacing and the position of first vehicle at the current time, the reference position difference is zero, the tracking position error comprises at least one of a difference between the position difference and the reference position distance, the minimum of zero and the difference between the position difference and the reference position distance, or zero if a speed adjustment is desired during a turn, and the reference heading is represented in at least one of the first vehicle heading reference frame, the second vehicle heading reference frame at the current time minus the desired spacing interval expressed as a time, the first vehicle track reference frame, the second vehicle track reference frame at the current time minus the desired spacing interval expressed as a time or another suitable reference frame.

10. The method of claim 9, further comprising displaying the tracking position error input to the first vehicle.

* * * * *